Jan. 20, 1970   J. M. FERNANDEZ   3,490,596
APPARATUS FOR CLEANING WATER
Filed Jan. 4, 1968
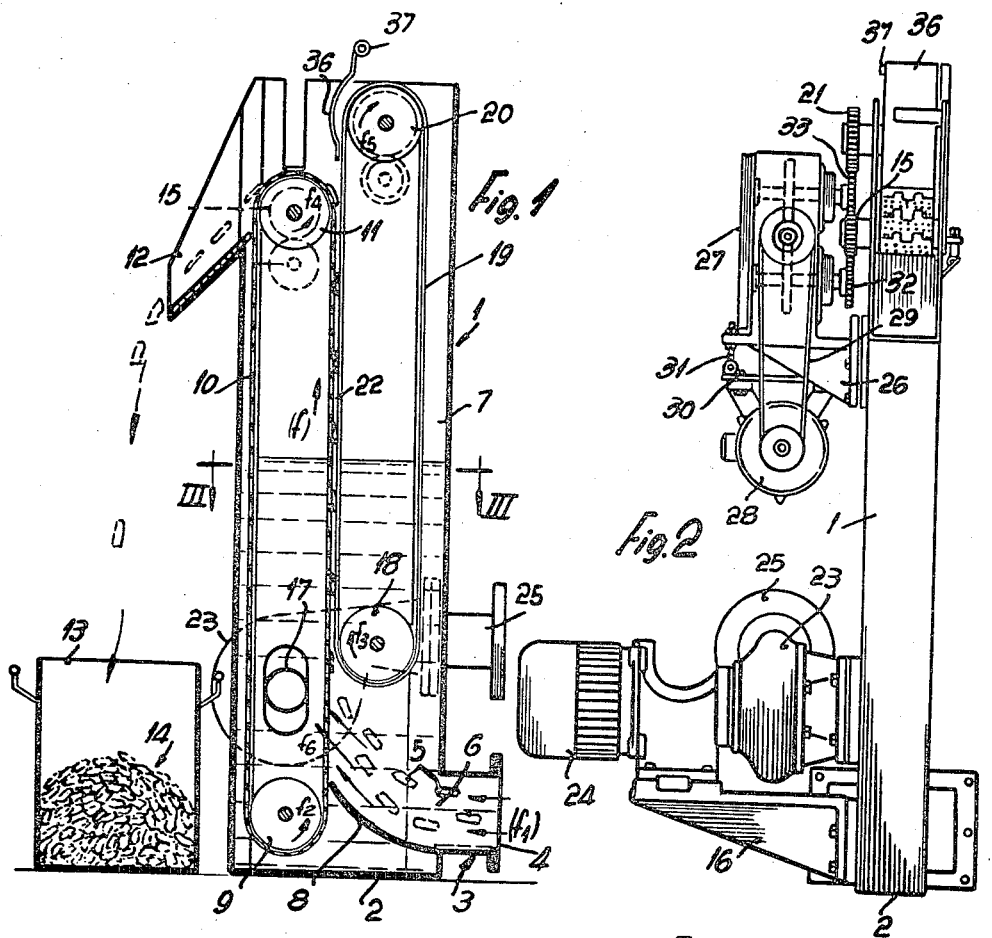
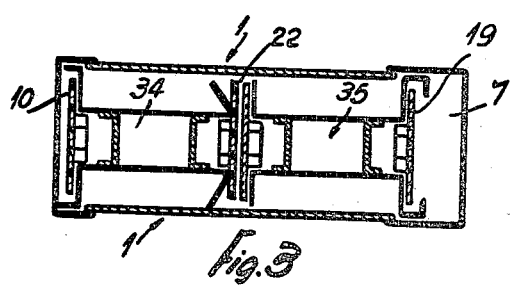
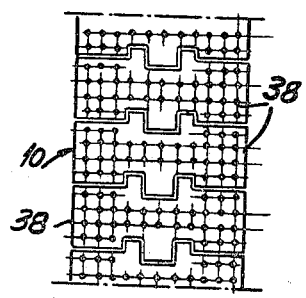
INVENTOR
JUAN M. FERNANDEZ
BY Richards & Geier
ATTORNEYS United States Patent Office 3,490,596
Patented Jan. 20, 1970

3,490,596
APPARATUS FOR CLEANING WATER
Juan Manuel Fernandez, Buenos Aires, Argentina, assignor to Valmarco Sociedad Anonima Industrial y Comercial, Buenos Aires, Argentina, a corporation of Argentina
Filed Jan. 4, 1968, Ser. No. 695,799
Claims priority, application Argentina, July 24, 1967, 208,671
Int. Cl. B01d 33/04
U.S. Cl. 210—400          3 Claims

ABSTRACT OF THE DISCLOSURE

An apparatus for removing articles of the nature of labels or tags floating in water, comprises two endless belts movable within a casing. One of these belts is perforated and has a lower section located between an inlet for the dirty water and a suction opening connected with a water pump, so that the dirty water is sucked through the perforations of this belt section and leaves its deposits upon that section. The second belt serves as a holder for these deposits which move upon the first belt to a discharge opening located at the top of the container.

---

This invention relates to an apparatus for cleaning water and refers more particularly to an apparatus for removing from wash water various discardable elements carried by the water, particularly labels and tags.

In many industrial plants water is used to wash out various discarded pieces, such as discarded labels or tags. As a rule, water flows in a closed cycle so that it must be recovered. However, as a rule the proportion of discarded articles in water is quite high, so that after several operating cycles, steps must be undertaken to remove the floating articles so as to permit an uninterrupted flow of the water.

The usual processes of decanting or filtration are not satisfactory for this purpose since due to the size and nature of the floating articles the filters will easily become obstructed and the filtration paths will be extremely short, so that filtering is difficult and unprofitable.

An object of the present invention is to eliminate these drawbacks by providing a hydromechanic apparatus operating to recover water which is free from the above-mentioned articles.

Another object is the provision of a machine carrying out a hydromechanical process by means of which labels, tags and similar articles are not only removed from water but are also squeezed out, so that they contain a minimum amount of water and can be readily destroyed.

Other objects of the present invention will become apparent in the course of the following specification.

In the accomplishment of the objectives of the present invention it was found desirable to provide an apparatus having a casing the lower section of which has an inlet for the dirty liquid which is being treated and an upper section provided with a discharge. The casing contains a perforated endless belt the width of which is the same as that of the casing. The endless belt extends between a guide roller located close to the bottom of the casing and a feed roller mounted in the upper part of the casing. A second endless belt having the same width as the first-mentioned belt extends between a guide roller located above the inlet and an upper feed roller. Strands of the two belts face each other and are located close to each other to serve as carriers for the residue removed from the water by means of a pump.

The invention will appear more clearly from the following detailed description when taken in connection with the accompanying drawing showing by way of example, a preferred embodiment of the inventive idea.

In the drawing:

FIGURE 1 is a longitudinal section through an apparatus constructed in accordance with the principles of the present invention.

FIGURE 2 is a front view of the apparatus shown in FIG. 1.

FIGURE 3 is a transverse section along the line III—III of FIG. 1.

FIGURE 4 is a detail view of a portion of a perforated endless belt.

The apparatus shown in the drawing includes a casing 1 having a bottom 2. The casing is connected close to its bottom with a duct 3 through which dirty water containing labels, tags and other articles 5 is introduced into the casing. The end 4 of the duct 3 is connected to a pipe (not shown) through which the dirty water flows into the casing.

The opening 6 of the duct 3 communicates with the inner chamber 7 of the casing which is preferably rectangular in cross section. A guiding screen 8 is located within the chamber close to the opening 6, so that the flow of water is directed slightly upwardly, as indicated by arrows in FIG. 1.

A guide roller 9 is located to the side of the screen 8. A perforated endless belt 10 extends around the roller 9. The width of the belt 10 is substantially the same as that of the chamber 7, so that there is only a small clearance between the edges of the belt and the adjacent walls of the chamber 7, as shown in FIG. 3. The belt 10 also passes over an upper feed roller 11. The roller 11 is located close to a discharge channel 12 which extends outwardly from the casing 1 and which is inclined toward a receptacle 13 adapted to receive the residues dropped from the discharge channel 12.

The feed roller 11 is supported by bearings and is connected with a drive pinion 15.

The casing 1 has an opening 17 located above the roller 9 so that it is situated between the two strands of the belt 10. The opening 17 communicates with the suction duct of a liquid circulating pump 23.

The pump 23 sucks in the water entering the chamber 7 through the inlet 3 so that water will flow through the perforations of the belt 10, while the residues 5 will remain upon the outer surface of the belt 10 which is moved upwardly in the direction of the arrow f.

A second guide roller 18 is located close to the section of the belt 10 upon which the residues are deposited. A second endless belt 19 which has no perforations extends over the guide roller 18 and over an upper feed roller 20. The roller 20 is connected with a gear wheel 21.

The belt 19 is located close to and opposite the belt 10, a narrow space 22 being provided between the two belts. The belt 19 is of the same width as the belt 10 so that the two belts extend close to the opposite walls of the chamber 7.

The casing 1 carries a bracket 16 located close to its base and supporting the pump 23 and the motor 24 which drives the pump 23. The pump 23 has a discharge duct 25.

Close to its top the casing 1 carries a bracket 26 which supports a reducing gear 27 driven by a motor 28 through an endless belt 29. The motor 28 is attached to a platform 30 which is adjustably connected with the bracket 26 by screws 31, so that the operating tension of the belt 29 may be conveniently adjusted. The reducing gear 27 is connected with the shaft carrying the gear 32 and another shaft carrying the gear 33.

The gear 32 meshes with the gear 15 driving the feed roller 11, while the gear 33 meshes with the gear 21 driving the roller 20. Thus the speed of the belt 10 is somewhat greater than that of the belt 19.

As shown in FIG. 3, removable supports 34 and 35 are located within the interior 7 of the casing 1. These supports carry the guide rollers and the feed rollers so that the entire drive can be conveniently removed for cleaning purposes.

A plate 36 which is swingably supported at 37 rests permanently upon a strand of the belt 19 so as to clean the belt.

As shown in FIG. 4 the belt 10 may consist of perforated plates 38 joined by pegs extending through lugs provided upon the inner surfaces thereof. The belt 19 may consist of similar and similarly connected plates which, however, are not perforated.

The operation of the apparatus is apparent from the above description:

Dirty water flowing into the casing 1 through the inlet 3 as shown by arrow f1, is sucked through one of the strands of the perforated belt 10 by the pump 23, as indicated by the arrow f6, so that deposits 5 are left upon the belt. Clean water is removed through the outlet 25.

The deposits 5 are raised by the belt 10 and are supported by the belt 19 in the space 22 until they reach the top of the roller 11 and are ejected through the discharge 12 into the container 13 forming a heap 14. The direction of rotation of the rollers 9, 18, 11 and 20 is indicated by the arrows f2, f3, f4 and f5, respectively.

It is apparent that the described embodiment has been given solely by way of illustration and not by way of limitation and that it is capable of various modifications within the scope of the present invention. All such variations and modifications are to be included within the scope of the present invention.

What is claimed is:

1. An apparatus for cleaning water, comprising a container having an inlet for deposit-containing water located close to the bottom thereof and an outlet for the deposits located close to the top thereof, a perforated endless belt located within said container and extending substantially from said inlet to said outlet, a guide roller located close to the bottom of said container, a feed roller located close to the top of said container, said perforated endless belt extending over said rollers, a second non-perforated endless belt having a portion extending parallel and close to a portion of the first-mentioned endless belt, another guide roller located above said inlet, another feed roller located close to the first-mentioned feed roller, means connected with said feed rollers for driving them at different speeds, the second-mentioned endless belt extending over the second-mentioned guide roller and the second-mentioned feed roller, said belts being in alignment and having a width which is practically equal to that of the interior of said container, and a water pump, said casing having a suction opening communicating with said water pump, a portion of the first-mentioned endless belt being located between said inlet and said suction opening, whereby deposits carried by the dirty water are deposited upon said portion of the perforated first-mentioned belt.

2. An apparatus in accordance with claim 1, wherein said means drive the first-mentioned feed roller faster than the second-mentioned feed roller.

3. An apparatus for cleaning water, comprising a container having an inlet for deposit-containing water located close to the bottom thereof and an outlet for the deposits located close to the top thereof, a perforated endless belt located within said container and extending substantially from said inlet to said outlet, a guide roller located close to the bottom of said container, a feed roller located close to the top of said container, said perforated endless belt extending over said rollers, a second non-perforated endless belt having a portion extending parallel and close to a portion of the first-mentioned endless belt, each of said belts comprising a plurality of interconnected plates, another guide roller located above said inlet, another feed roller located close to the first-mentioned feed roller, the second-mentioned endless belt extending over the second-mentioned guide roller and the second-mentioned feed roller, said belts being in alignment and having a width which is practically equal to that of the interior of said container, removable supports located within said casing and carrying said guide rollers and said feed rollers, driving means located outside of said casing and operatively connected with said feed rollers, and a water pump, said casing having a suction opening communicating with said water pump, a portion of the first-mentioned endless belt being located between said inlet and said suction opening, whereby deposits carried by the dirty water are deposited upon said portion of the perforated first-mentioned belt.

References Cited

UNITED STATES PATENTS

| | | | |
|---|---|---|---|
| 2,885,080 | 5/1959 | Goldman | 210—160 |
| 3,159,574 | 12/1964 | Benson | 210—400 X |

FOREIGN PATENTS

| | | |
|---|---|---|
| 277,725 | 9/1914 | Germany. |

REUBEN FRIEDMAN, Primary Examiner

T. A. GRANGER, Assistant Examiner